US010316945B2

(12) United States Patent
Olsson

(10) Patent No.: US 10,316,945 B2
(45) Date of Patent: Jun. 11, 2019

(54) LINEAR ACTUATOR DEVICE

(71) Applicant: REAC AB, Amal (SE)

(72) Inventor: Johan Olsson, Amal (SE)

(73) Assignee: REAC AB, Amal (SE)

( * ) Notice: Subject to any disclaimer, the term of this patent is extended or adjusted under 35 U.S.C. 154(b) by 212 days.

(21) Appl. No.: 15/429,621

(22) Filed: Feb. 10, 2017

(65) Prior Publication Data

US 2017/0241524 A1 Aug. 24, 2017

(30) Foreign Application Priority Data

Feb. 24, 2016 (SE) ...................................... 1650242

(51) Int. Cl.
*F16H 25/20* (2006.01)
*A61G 7/10* (2006.01)
*F16H 1/20* (2006.01)
*F16H 57/021* (2012.01)
(Continued)

(52) U.S. Cl.
CPC ....... *F16H 25/2015* (2013.01); *A61G 7/1017* (2013.01); *F16H 1/203* (2013.01);
(Continued)

(58) Field of Classification Search
CPC .... F16H 25/2015; F16H 1/203; F16H 57/021; F16H 2025/209; A61G 7/1017; H02K 7/06; H02K 7/1166
See application file for complete search history.

(56) References Cited

U.S. PATENT DOCUMENTS 8,308,603 B2 11/2012 Knudsen
8,410,731 B2 * 4/2013 Knudsen ............. F16H 25/2021
318/135
(Continued)

FOREIGN PATENT DOCUMENTS

EP 2194294 A1 * 6/2010 ................ B66F 3/08
EP 2194294 A1 6/2010
WO 9830816 7/1998

OTHER PUBLICATIONS

Extended European Search Report for European Patent Application No. 17155313.4, Jul. 26, 2017, 7.

*Primary Examiner* — Zakaria Elahmadi
(74) *Attorney, Agent, or Firm* — Johnson, Marcou & Isaacs, LLC; John M. Harrington, Esq.

(57) ABSTRACT

This invention relates to a linear actuator, comprising an electric motor (10), a worm gear (13, 14), a transmission (15, 16, 19), an outer tube (2) and a spindle (12), said spindle (12) being in connection with the transmission (15, 16, 19), a spindle nut (11) on the spindle (12), a thrust bearing (20) for supporting a shaft end (21) of the spindle (12), wherein the connection between the shaft end of the spindle (12) and the transmission (15, 16, 19) allows a mutual axial movement so that axial forces are only lead through the spindle (12) bypassing the transmission (15, 16, 19) and directly to the thrust bearing (20), wherein a support structure (17, 18, 24, 28) fixedly connects the outer tube (2) and a lower bracket (20, 22), wherein said worm gear (13, 14) drives a shaft (19) included in said transmission (15, 16, 19), which shaft (19) has a driving gear wheel (15) fixedly attached thereto, arranged to transmit torque to a driven gear wheel (16) fixedly attached to the spindle (12), wherein said transmission (15, 16, 19) is arranged to allow axial displacement of the driven gear wheel (16) in relation to the driving gear wheel (15).

9 Claims, 3 Drawing Sheets

(51) Int. Cl.
 *H02K 7/06* (2006.01)
 *H02K 7/116* (2006.01)
(52) U.S. Cl.
 CPC ............. *F16H 57/021* (2013.01); *H02K 7/06* (2013.01); *H02K 7/1166* (2013.01); *F16H 2025/209* (2013.01)

(56) References Cited

U.S. PATENT DOCUMENTS

| | | | | |
|---|---|---|---|---|
| 2005/0160846 | A1* | 7/2005 | Chiang | F16H 25/20 74/89.35 |
| 2007/0137330 | A1* | 6/2007 | Hoth | A61B 6/0457 74/89.23 |
| 2012/0241281 | A1* | 9/2012 | Franz | F16D 29/005 192/84.6 |
| 2013/0112022 | A1* | 5/2013 | Shimizu | F16H 25/20 74/89.34 |
| 2014/0338480 | A1* | 11/2014 | Wu | F16H 25/20 74/89.23 |
| 2015/0300479 | A1* | 10/2015 | Frank | F16H 57/021 324/207.2 |
| 2016/0053912 | A1* | 2/2016 | Lenz | F16K 31/048 251/129.01 |

* cited by examiner

LINEAR ACTUATOR DEVICE

CROSS REFERENCE TO RELATED APPLICATIONS

The present application claims the benefit of priority under 35 U.S.C. § 119 to Swedish Patent Application No. 1650242-9 filed Feb. 24, 2016, which is incorporated herein in its entirety by this reference.

TECHNICAL FIELD

The present invention relates to a linear actuator device, comprising an electric motor, a worm gear a transmission, an outer tube and a spindle, said spindle being in connection with the transmission, a spindle nut on the spindle, a thrust bearing for supporting a shaft end of the spindle, wherein the connection between the shaft end of the spindle and the transmission allows a mutual axial movement so that axial forces are only lead through the spindle bypassing the transmission and directly to the thrust bearing and wherein a support structure fixedly connects the outer tube and a lower bracket.

BACKGROUND ART

Linear actuators are well-known components for use in machines and control devices, not at least they are widely used within the hospital and care sectors, where they are used for adjustable furniture such as patient lifting devices, beds etc. In this kind of applications, the linear actuator transfers a force between the attachment points of the actuator.

The construction of linear actuators, which can transfer the forces between the two attachment points without overloading the transmission and thus causing wearing, is difficult and often results in the construction being complicated and expensive. Further it mostly is more voluminous than desired. This is particularly the case where the linear actuator is equipped with a transmission, which comprises a planetary gear, since the configuration of a worm gear driving the sun gear of the planetary gear, will always result in a motor orientation perpendicular to the actuator main axis.

WO 98/30816, U.S. Pat. Nos. 8,410,731 and 8,308,603 disclose linear actuators where the transmission comprises a planetary gear, e.g. implying many components. Many components mean more expenses for material and production and that the linear actuator becomes voluminous.

The purpose of the invention is to provide a solution to the outlined problem, i.e. to achieve a linear actuator which is capable of leading the axial forces in the actuator around the transmission and that is cost-efficient, and that may provide a more compact and/or simple construction.

SUMMARY OF THE INVENTION

The main object of the present invention is to provide a linear actuator which eliminates or at least minimizes any or some of the problems mentioned above, which is achieved in accordance with a device in accordance with claim 1.

Thanks to the invention there is provided a more compact linear actuator, which moreover is simple in its construction and which is capable of leading the axial forces in the actuator through the transmission, bypassing the gear wheels, i.e. without any substantial axially reaction forces from the load acting upon the gear wheels.

According to further aspects of the invention it may be preferred;

that said gear wheels are spur gear wheels, which provides the advantage that the axial displacement may be achieved at minimal cost.

that said driven gear wheel is fixedly attached to a hub, which hub is arranged with a displacement limiting member arranged to form a gap in relation to said support structure defining an upper stop limit for said displacement, which provides the advantage that an easy and cost efficient technical solution may be provided for a safe and secure device.

that a lower stop limit of said gap is achieved by having said shaft end of the spindle abutting the thrust bearing, which also provides the advantage that an easy and cost efficient technical solution may be provided for a safe and secure device that a control sensor is arranged to sense an axial motion of said spindle and to stop the motor in connection with sensing a predetermined maximum allowed displacement that is equal to or less than said gap, which also provides the advantage that an easy and cost efficient technical solution may be provided for a safe and secure device.

that said control sensor is arranged with a stop contact member arranged to contact the driven spur gear wheel in connection with reaching said predetermined maximum allowed displacement, which also provides the advantage that an easy and cost efficient technical solution may be provided for a safe and secure device.

that said support structure is arranged in a manner that also provides the advantage that an easy and cost efficient technical solution may be provided for a safe and secure device.

BRIEF DESCRIPTION OF THE DRAWINGS

In the following, the invention will be described in more detail with reference to preferred embodiments and the appended drawings, where.

DETAILED DESCRIPTION

Figure 1:
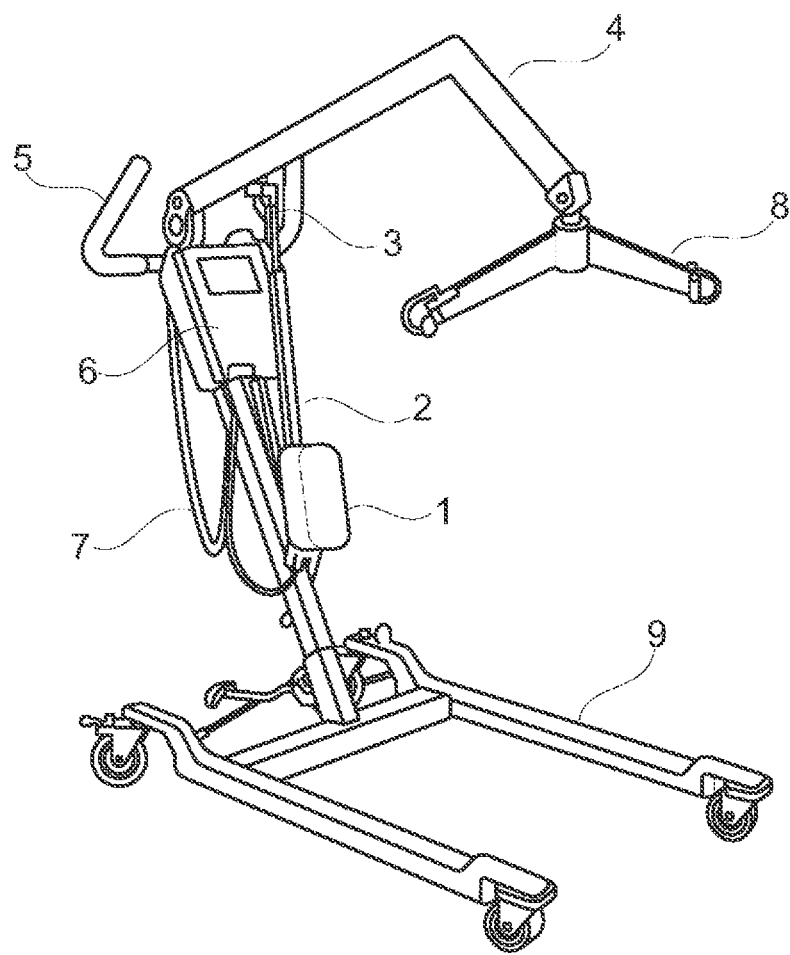
FIG. 1 shows a perspective view of an embodiment according to the invention.

In FIG. 1 there is shown patient lifting equipment including a basic support structure 5, 9 and lifting members 4, 8 of a well-known kind. The patient lifting device includes a linear actuator 1, 2, 3 that via control equipment 6, 7 may assist in lifting a patient by means of the lifting members 4, 8. FIG. 1 demonstrates an example of use of the invention, wherein the invention may provide substantial advantages compared to the use of known linear actuators.

Figure 2:
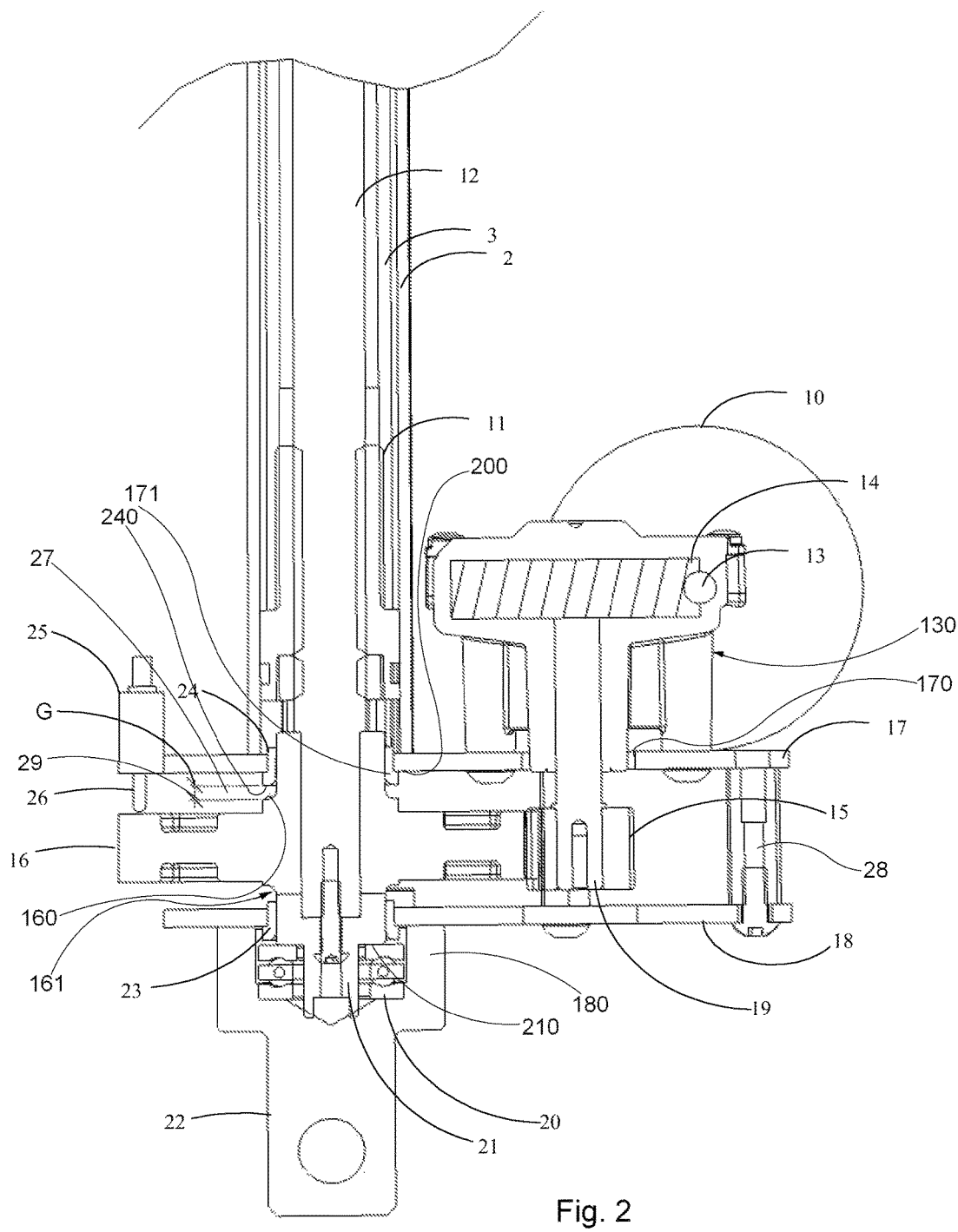
FIG. 2 shows a cross sectional view of a part of a linear actuator device according to the invention, and, FIG. 3 shows a schematic view of an alternate embodiment of the invention.

In FIG. 2 there is shown a cross sectional schematic view of a linear actuator according to a preferred embodiment of the invention. It is shown that the linear actuator is powered by an electric motor 10, which as shown in FIG. 1 normally is positioned within a housing 1. The electrical motor 10 powers a motor axis, having a worm 13 that in turn transmits torque to a worm gear wheel 14. The worm gear unit 130 is fixedly attached to a first support wall 17. In the support wall 17 there is a passage 170 through which a shaft 19 extends, which shaft 19 is powered by the worm gear wheel 14.

At the end of the worm gear shaft 19 there is attached a first spur gear wheel 15. This spur gear wheel 15 is arranged to directly transmit torque to a second spur gear wheel 16. The second spear gear wheel 16 is fixedly connected to a hub 161 (e.g. by means of being integrated or screw attached) that is fixedly attached to the end of a spindle 12. The fixation of the hub 161 is achieved by means of splines (or some other torque transferring arrangement, e.g. wedge) in combination with a spindle end cap 21. The spindle end cap 21 has a rear abutment surface 210 that abuts a trust bearing 20. The trust bearing 20 is secured within a lower actuator mount 22.

The lower actuator mount 22 is fixedly attached to a second support wall 18. The second support wall 18 is fixedly connected at distance from the first support wall 17, by means of attachment members 28. The spur gear wheels 15, 16 will be positioned within the space delimited by the support walls 17, 18. The second support wall 18 has a passage 180 for the end part of the spindle 12, here in the form of an end cap 21 attached to the spindle 12. A bearing member 23 is arranged between the outer periphery of the end cap 21 and the passage 180 in the second wall 18.

On the spindle 12 there is arranged a spindle nut 11. On the spindle nut 11 there is arranged an inner tube 3. The inner tube 3 is moveable together with the spindle nut 11, within an outer tube 2.

The outer tube 2 has its rear end 200 fixedly attached to the first wall member 17. The spindle 12, the hub 161 and the spindle end cap 21 are axially moveable arranged a predetermined limited distance, within a gap G. This is achieved by having the hub 161 arranged with a first displacement limiting member 160, here in the form an edge, that is positioned at a distance (corresponding to the gap G, when the spindle 12 is in its rear most position) from an upper stop limit 27, here in the form a lower end 240 of an upper spindle bearing 24. The upper spindle bearing 24 is fixedly attached to the first support wall 17 within a second passage 171, adapted for the bearing 24 and the spindle 12. The lower stop limit 29 of the play G is in this embodiment achieved by having a lower abutment surface 210 of the end cap in contact with the trust bearing 20. Accordingly, the spindle 12 may be moved within a gap G by applying a pulling force to the spindle 12, which will move the abutment surface 210 away from the trust bearing 20 and move the spindle, the hub 161 and end cap 21 until the edge 160 of the hub 161 is contacting the lower end 240 of the second spindle bearing 24. The outer way will be achieved automatically, i.e. once load is applied it will push the spindle 12 in contact with the trust bearing 20.

A control sensor 25, 26 is fixedly attached to the first support wall 17. This control sensor 25, 26 has in this embodiment a contact member 26 that at its front end may be in contact with the driven gear wheel 16. Accordingly, when the spindle 12 is moved to close the gap G the contact 26 will be pushed in by the driven gear wheel 16, thereby providing the ability to give signal at a predetermined position of displacement of the contact member 26. This may for instance be used to arrange for a motor stop control signal when a predetermined displacement of the contact member 26 has been reached, facilitating a down-force limit safety arrangement Accordingly, the invention presents a linear actuator device that comprises an electrical motor 10 which operates a worm gear 13, 14, which in turn transmits torque to a gear transmission 15, 16, 19 for rotation of the spindle 12, which in turn is transferred to linear movement of the spindle nut 11 that controls the position of the inner tube 3. The force that is exerted by a load applied to the upper end of the inner tube 3 will then be transmitted directly via the spindle 12 to the trust bearing 20. Accordingly, no actual forces will be transferred to the transmission 15, 16 thanks to the use of axially displaceable gear wheels, which also facilitates axial displacement of the driven spur gear wheel 16 in relation to the driving gear wheel 15. Thanks to having the driven gear wheel 16 attached to a hub 161 having a displacement limiting member 160 there may be provided a gap G, in relation to the support structure 17, 18, 24, 28 such that the spindle 12 together with the driven spur gear wheel 16 and the end cap 21 may be axially displaced, and further providing the advantage that the gear transmission facilitates a transfer of load directly on to the trust bearing 20.

All in all, this provides a simple and reliable structure in comparison with known prior art, which provides many advantages, such as ease of maintenance and relatively low cost.

Figure 3:
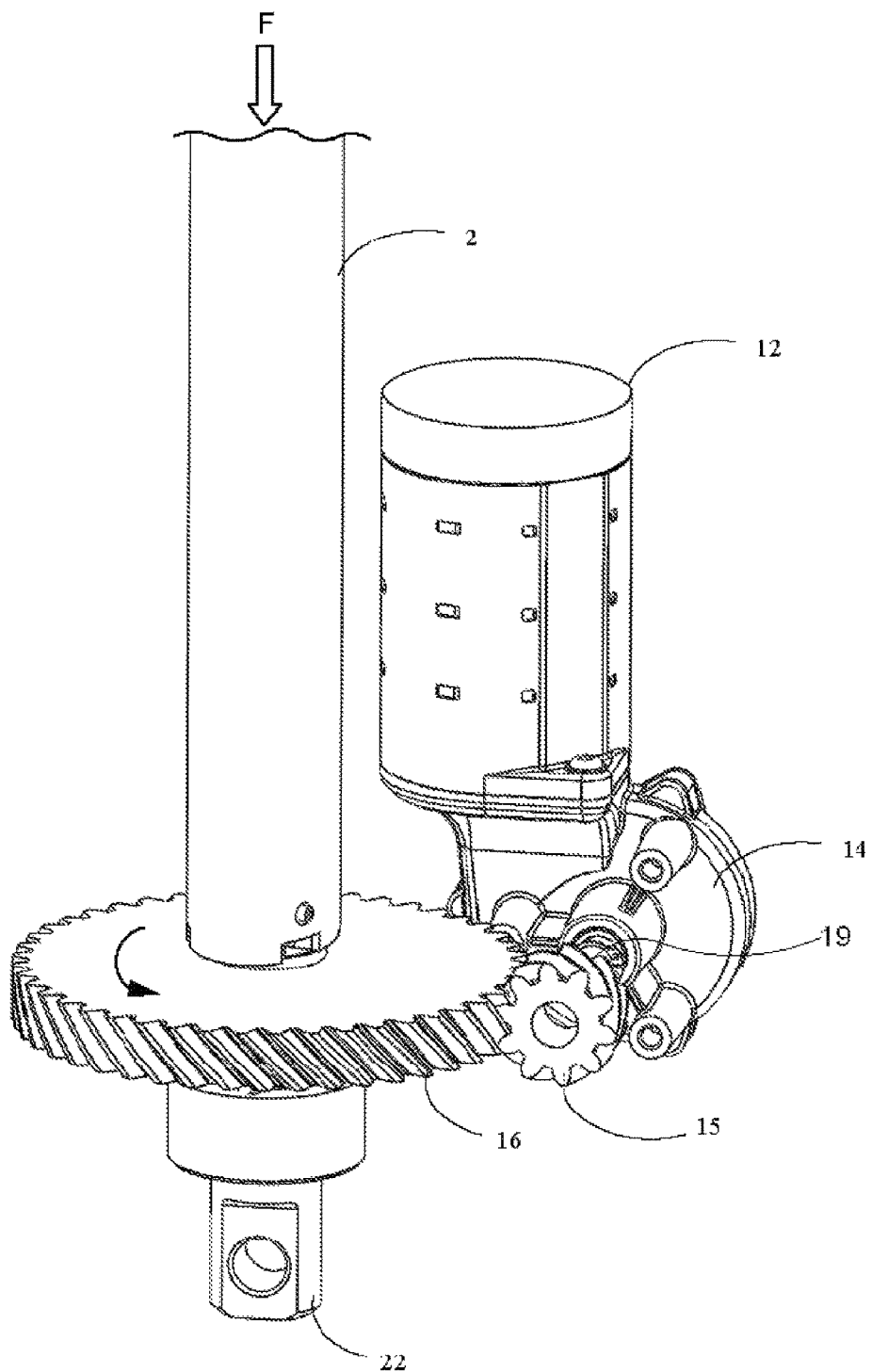

In FIG. 3 there is shown a schematic perspective view of a further embodiment according to the invention, wherein the cross angle between driving and driven gears 15, 16 will allow for having the motor 10 mounted axially along the outer tube 2 thus reducing overall size. This kind of solution is not possible if using a design as suggested in the prior art, e.g. U.S. Pat. No. 8,308,603. Most details are the same, i.e. fulfil the same functions, as has already been described in connection with FIG. 2 and therefore there is a mere focus on different features. Here, the driving wheel 15 and the driven wheel 16 do not have straight cut teeth, but instead helical teeth. It is preferred to position the helical teeth such that a lifting reaction force will be transferred from the driving wheel 15, to the driven wheel 16, in connection with moving the aid device 4, 8 downwardly to thereby have that reaction force assisting in moving the driven wheel 16 against the sensor 25, 26. Otherwise there is a risk that the reaction force eliminates actuation of the down-force limit safety arrangement. In the shown embodiment it means arranging the teeth such that a clockwise rotation of the driving wheel will rotate the driven wheel anti-clockwise in connection with moving the inner tube 3 downwardly. It will be possible to move the spindle 12 axially in relation to the housing and the outer tube 2, whereby simultaneously with the axial movement the teeth will effect a small rotational movement of the spindle 12. However, this small rotation movement of the spindle 12 will not cause any substantial counterforce, thereby fulfilling in principle the same basic function as described in connection with FIG. 2. In some applications it may be needed to arrange a resilient counter force between the driven wheel 16 and the support structure, to eliminate undesired stops caused by the reaction force, e.g. if the weight/load acting on the spindle 12 is less than the reaction force. An advantage with the embodiment shown in FIG. 3 is that the motor 12 can be positioned to extend in parallel with the spindle and the outer tube 2, which facilitates compact arrangement.

The invention is not limited by the embodiments presented above, but may be varied within a plurality of aspects without departing from the basic principles of the invention. For instance, it is evident that the resilient force that may be desired, may be implemented in various forms, e.g. a helical spring, air cushions, resilient polymers, etc. Further it is evident that a variety of known per se devices/solutions may be used but still maintain the basic principles of the solution according to the invention. Moreover, it is foreseen that principles of the solution presented in connection with FIG. 3 may be the subject for its own protection, without limitation to the use of the preferred kind of gear wheels as shown in FIGS. 1 and 2, i.e. instead a focus on the novel arrangement of the motor and its attachment/connection to the rest of the actuator.

The invention claimed is:

1. A linear actuator, comprising an electric motor (10), a worm gear (13, 14), a transmission (15, 16, 19), an outer tube (2) and a spindle (12), said spindle (12) being in connection with the transmission (15, 16, 19), a spindle nut (11) on the spindle (12), a thrust bearing (20) for supporting a shaft end (21) of the spindle (12), wherein the connection between the shaft end of the spindle (12) and the transmission (15, 16, 19) allows a mutual axial movement so that axial forces are only lead through the spindle (12) bypassing the transmission (15, 16, 19) and directly to the thrust bearing (20), wherein a support structure (17, 18, 24, 28) fixedly connects the outer tube (2) and a lower bracket (20, 22), wherein said worm gear (13, 14) drives a shaft (19) included in said transmission (15, 16, 19), which shaft (19) has a driving gear wheel (15) fixedly attached thereto, wherein said transmission (15, 16, 19) is arranged to transmit torque to a driven gear wheel (16) fixedly attached to the spindle (12), wherein said transmission (15, 16, 19) is arranged to allow axial displacement of the driven gear wheel (16) in relation to the driving gear wheel (15) by having said driven gear wheel (16) fixedly attached to a hub (161) with a displacement limiting member (160) arranged to form a gap (G) in relation to said support structure (17, 18, 24, 28) defining an upper stop limit (27) for said displacement and in that a control sensor (25, 26) is arranged to sense an axial motion of said spindle (12) and to stop the electric motor (10) in connection with sensing a predetermined maximum allowed axial displacement that is equal to or less than said gap (G).

2. A linear actuator according to claim 1, characterized in that said gear wheels (15, 16) are spur gear wheels.

3. A linear actuator according to claim 1, characterized in that a lower stop limit (29) of said gap (G) is achieved by having said shaft end (21) of the spindle (12) abutting the thrust bearing (20).

4. A linear actuator according to claim 1, characterized in that said control sensor (25, 26) is arranged with a stop contact member (26) arranged to contact the driven gear wheel (16) in connection with reaching said predetermined maximum allowed displacement.

5. A linear actuator according to claim 1, characterized in that said support structure includes first and second wall members (17, 18) arranged to provide support for a worm gear unit (130) and to provide space between the wall members (17, 18) for said gear wheels (15, 16).

6. A linear actuator according to claim 5, characterized in that there is a first passage (171) in the first wall member (17) and a second coaxial passage (180) in the second wall member (18), wherein said first passage (171) is arranged to form a first centering support for the spindle (12) and the second passage (180) is arranged to form a second centering support for the spindle (12).

7. Method for operating a linear actuator, said linear actuator comprising a linear actuator, comprising an electric motor (10), a worm gear (13, 14), a transmission (15, 16, 19), an outer tube (2) and a spindle (12), said spindle (12) being in connection with the transmission (15, 16, 19), a spindle nut (11) on the spindle (12), a thrust bearing (20) for supporting a shaft end (21) of the spindle (12), wherein the connection between the shaft end of the spindle (12) and the transmission (15, 16, 19) allows a mutual axial movement so that axial forces are only lead through the spindle (12) bypassing the transmission (15, 16, 19) and directly to the thrust bearing (20), wherein a support structure (17, 18, 24, 28) fixedly connects the outer tube (2) and a lower bracket (20, 22) wherein said worm gear (13, 14) drives a shaft (19) included in said transmission (15, 16, 19) and arranging said shaft (19) with a driving gear wheel (15) which transmits torque to a driven gear wheel (16) being fixedly attached to the spindle and characterized by arranging said transmission (15, 16, 19) to facilitate axial displacement of the driven gear wheel (16) in relation to the driving gear wheel (151, by use of a displacement limiting member (160) arranged to enable the driven gear wheel (16) to be moved axially within a predetermined gap (G) and by arranging a control sensor (25, 26) to sense actual movement of said spindle (12) that stops the electric motor (101 in connection with sensing a predetermined maximum axial displacement.

8. Method according to claim 7, characterized by having an upper stop limit (27) for said displacement when said displacement limiting member (160) contacts said support structure (17, 18, 24, 28).

9. Method according to claim 7, characterized by arranging a lower stop limit (29) for said axial displacement when a spindle shaft end (21) abuts the thrust bearing (20).

* * * * *

UNITED STATES PATENT AND TRADEMARK OFFICE
CERTIFICATE OF CORRECTION

PATENT NO. : 10,316,945 B2  
APPLICATION NO. : 15/429621  
DATED : June 11, 2019  
INVENTOR(S) : Johan Olsson Page 1 of 1

It is certified that error appears in the above-identified patent and that said Letters Patent is hereby corrected as shown below:

In the Claims

Column 6  
Line 31, "(151" should read -- (15) --;

Column 6  
Line 36, "(101" should read -- (10) --.

Signed and Sealed this  
Thirtieth Day of July, 2019

Andrei Iancu  
*Director of the United States Patent and Trademark Office*